(12) United States Patent
Gribble et al.

(10) Patent No.: US 6,271,276 B1
(45) Date of Patent: Aug. 7, 2001

(54) POLYURETHANE FOAMS PREPARED FROM MECHANICALLY FROTHED POLYURETHANE DISPERSIONS

(75) Inventors: Michael Y. Gribble, Wollerau (CH); Rick L. Tabor, Lake Jackson, TX (US); James J. Jakubowski, Midland, MI (US); Alan K. Schrock, Lake Jackson, TX (US); Paulus C. J. M. Van Bellegem, Philippine; James G. Kennedy, Hulst, both of (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/464,113

(22) Filed: Dec. 16, 1999

Related U.S. Application Data

(60) Provisional application No. 60/114,035, filed on Dec. 29, 1998.

(51) Int. Cl.$^7$ .................................................. C08J 9/00
(52) U.S. Cl. .................. 521/133; 521/159; 428/314.4; 264/50; 264/48
(58) Field of Search ........................... 521/67, 133, 159; 428/314.4, 304.4; 264/50, 48

(56) References Cited

U.S. PATENT DOCUMENTS

| | | |
|---|---|---|
| 2,968,575 | 1/1961 | Mallonee . |
| 3,617,413 | 11/1971 | Elbert . |
| 3,730,822 | 5/1973 | Lovell et al. . |
| 3,755,212 | 8/1973 | Dunlap et al. . |
| 3,772,224 | 11/1973 | Marlin et al. . |
| 3,821,130 | 6/1974 | Barron et al. . |
| 3,842,519 | 10/1974 | Lapidus . |
| 3,862,879 | 1/1975 | Barron et al. . |
| 3,989,869 | 11/1976 | Neumaier et al. . |
| 4,022,941 | 5/1977 | Prokai et al. . |
| 4,035,529 | 7/1977 | Meisert et al. . |
| 4,066,591 | 1/1978 | Scriven et al. . |
| 4,092,286 | 5/1978 | Noll et al. . |

(List continued on next page.)

FOREIGN PATENT DOCUMENTS

| | | |
|---|---|---|
| 335 735 | 3/1977 | (AT) . |
| 7607540 | 11/1976 | (BR) . |
| 1059682 | 7/1979 | (CA) . |
| 2099902 | 7/1993 | (CA) . |
| 224523 | 12/1985 | (CZ) . |
| 19 57 159 | 11/1969 | (DE) . |
| 20 09 338 | 9/1970 | (DE) . |
| 20 24 595 | 4/1971 | (DE) . |
| 20 31 160 | 12/1971 | (DE) . |
| 22 02 203 | 7/1973 | (DE) . |
| 23 43 294 | 4/1975 | (DE) . |
| 25 50 797 | 6/1977 | (DE) . |
| 25 56 621 | 6/1977 | (DE) . |
| 27 40 672 | 3/1979 | (DE) . |
| 28 07 479 | 8/1979 | (DE) . |
| 23 66 187 B1 | 12/1979 | (DE) . |
| 32 15 890 A1 | 4/1982 | (DE) . |
| 38 07 247 | 5/1989 | (DE) . |
| 39 42 851 A1 | 6/1991 | (DE) . |
| 00 12 981U | 9/1992 | (DE) . |
| 00 09 105U | 6/1993 | (DE) . |
| 19 52 1526 C1 | 10/1996 | (DE) . |
| 0 309 816 A2 | 6/1988 | (EP) . |
| 0 347 206 A1 | 6/1989 | (EP) . |
| 0 361 447 A2 | 9/1989 | (EP) . |
| 0 435 542 A2 | 12/1990 | (EP) . |
| 0 702 071 A2 | 8/1995 | (EP) . |
| 0 747 442 A2 | 12/1996 | (EP) . |
| 2 388 848 | 4/1978 | (FR) . |
| 2 311 532 A | 10/1997 | (GB) . |
| 58-122292 | 7/1983 | (JP) . |
| 61097315 | 5/1986 | (JP) . |
| 62177043 A2 | 8/1986 | (JP) . |
| 62179541 A2 | 8/1987 | (JP) . |
| 62230865 A2 | 10/1987 | (JP) . |
| 63000333 A2 | 1/1988 | (JP) . |
| 01006037 | 1/1989 | (JP) . |
| 01110506 A | 4/1989 | (JP) . |
| 02120309 A2 | 5/1990 | (JP) . |
| 03115421 A2 | 5/1991 | (JP) . |
| 03243638 A2 | 10/1991 | (JP) . |
| 07251422 A2 | 10/1995 | (JP) . |
| 09279482 | 10/1997 | (JP) . |
| 2047626 CO1 | 11/1995 | (RU) . |
| WO 81/02894 | 10/1981 | (WO) . |
| WO 96/27625 | 9/1996 | (WO) . |
| WO 96/40811 | 12/1996 | (WO) . |
| WO 96/40819 | 12/1996 | (WO) . |
| WO 97/43326 | 11/1997 | (WO) . |
| WO 98/09807 | 3/1998 | (WO) . |
| WO 98/16589 | 4/1998 | (WO) . |

OTHER PUBLICATIONS

"Szabadalmi Leiras", W. Kohlus & C$^\circ$ G. M. B. H. Ceg Plettenbergben, Jul. 11, 1910.

"The Properties of Polyurethanes and Their Applications", J. M. Buist, B.Sc., F.Inst.P., F.I.R.I., and A. Lowe, PhD., M.Sc., A.R.I.C., Feb. 1959, pp. 13–27.

"Integral Latex Foam Carpet Cushioning", P. L. Fitzgerald, Journal of Coated Fabrics, vol. 7 (Oct. 1977), p. 107.

"Latex Coating Systems For Carpet Backing", R. P. Brentin, Oct. 1982, Journal of Coated Rabricks, vol. 12, p. 82–91.

*Primary Examiner*—Rachel Gorr
*Assistant Examiner*—M D Bagwell

(57) ABSTRACT

The present invention is polyurethane dispersion composition that can be mechanically frothed to yield a foam that has good resiliency. Frothed foams of the present invention can be useful in cushioned flooring applications such as attached cushion broadloom, carpet tiles, carpet underlay, or vinyl flooring. Frothed foams of the present invention can also be useful as coatings for various textiles and for diapers.

17 Claims, No Drawings

U.S. PATENT DOCUMENTS

| | | |
|---|---|---|
| 4,112,161 | 9/1978 | Sorrells . |
| 4,171,391 | 10/1979 | Parker . |
| 4,171,395 | 10/1979 | Tillotson . |
| 4,216,130 | 8/1980 | Rigge et al. . |
| 4,237,264 | 12/1980 | Noll et al. . |
| 4,241,131 | 12/1980 | Bailey . |
| 4,259,384 | 3/1981 | Veiga et al. . |
| 4,278,482 | 7/1981 | Poteet et al. . |
| 4,286,003 | 8/1981 | Higgins et al. . |
| 4,296,159 | 10/1981 | Jenkines et al. . |
| 4,304,812 | 12/1981 | Perkins . |
| 4,405,393 | 9/1983 | Tillotson . |
| 4,483,894 | 11/1984 | Porter et al. . |
| 4,503,207 | 3/1985 | Heyman . |
| 4,512,831 | 4/1985 | Tillotson . |
| 4,515,646 | 5/1985 | Walker et al. . |
| 4,595,436 | 6/1986 | Walker et al. . |
| 4,611,044 | 9/1986 | Meyer et al. . |
| 4,619,853 | 10/1986 | Blyth et al. . |
| 4,643,930 | 2/1987 | Ucci . |
| 4,657,790 | 4/1987 | Wing et al. . |
| 4,690,953 | 9/1987 | Orr et al. . |
| 4,696,849 | 9/1987 | Mobley et al. . |
| 4,733,659 * | 3/1988 | Edenbaum ................. 128/156 |
| 4,742,095 | 5/1988 | Markusch et al. . |
| 4,747,346 | 5/1988 | Geel . |
| 4,775,558 | 10/1988 | Haas et al. . |
| 4,845,133 | 7/1989 | Priester, Jr. et al. . |
| 4,853,054 | 8/1989 | Turner et al. . |
| 4,853,280 | 8/1989 | Poteet . |
| 4,857,565 | 8/1989 | Henning et al. . |
| 4,879,322 | 11/1989 | Markusch et al. . |
| 4,913,958 | 4/1990 | Skaggs et al. . |
| 4,918,135 | 4/1990 | Probst et al. . |
| 4,957,798 | 9/1990 | Bogdany . |
| 4,970,754 | 11/1990 | Anderson et al. . |
| 5,037,864 | 8/1991 | Anand et al. . |
| 5,102,714 | 4/1992 | Mobley et al. . |
| 5,104,693 | 4/1992 | Jenkines . |
| 5,114,773 | 5/1992 | Bogdany . |
| 5,169,704 | 12/1992 | Faust et al. . |
| 5,221,710 | 6/1993 | Markusch et al. . |
| 5,227,198 | 7/1993 | Laura et al. . |
| 5,227,409 | 7/1993 | Mobley et al. . |
| 5,401,553 | 3/1995 | Miwa et al. . |
| 5,422,186 | 6/1995 | Biggeleben et al. . |
| 5,486,398 | 1/1996 | Weber et al. . |
| 5,539,021 | 7/1996 | Pate et al. . |
| 5,604,267 | 2/1997 | Duffy . |
| 5,608,000 | 3/1997 | Duan et al. . |
| 5,648,559 * | 7/1997 | Hager ................. 568/620 |
| 5,721,035 | 2/1998 | Dunn . |
| 5,722,603 | 3/1998 | Costello et al. . |
| 5,753,336 | 5/1998 | Stull . |
| 5,908,701 | 6/1999 | Jennings et al. . |
| 5,962,101 | 10/1999 | Irwin, Sr. et al. . |
| 6,020,391 * | 2/2000 | Leenslag ................. 521/155 |

* cited by examiner

POLYURETHANE FOAMS PREPARED FROM MECHANICALLY FROTHED POLYURETHANE DISPERSIONS

CROSS REFERENCE STATEMENT

This application claims benefit of U.S. Provisional Application No. 60/114,035, filed Dec. 29, 1998.

BACKGROUND OF THE INVENTION

This invention relates to polyurethane foams. This invention particularly relates to polyurethane foams prepared from aqueous polyurethane dispersions, and to a process for preparing same.

Polyurethane dispersions are known and can be useful for preparing polyurethane polymers that can themselves be useful in various applications. Polyurethane dispersions can be used, for example, to prepare coatings for leather; wood finishing; glass fiber sizing; textiles; adhesives; and automotive topcoats and primers. Polyurethane dispersions can be prepared by various processes, including, for example, those described in: U.S. Pat. No. 4,857,565; U.S. Pat. No. 4,742,095; U.S. Pat. No. 4,879,322; U.S. Pat. No. 3,437,624; U.S. Pat. No. 5,037,864; U.S. Pat. No. 5,221,710; U.S. Pat. No. 4,237,264; and, U.S. Pat. No. 4,092,286.

It is known that carpet backings can be prepared from polyurethane dispersions. For example, polyurethane dispersions prepared according to the process of U.S. application Ser. No. 09/039,978, filed Mar. 16, 1998, now abandoned, can be useful for preparing polyurethane carpet backings and polyurethane textile backings. Typically, mechanical froths of dispersions which are applied as a primary or secondary binder to a carpet backing are unstable due to high concentration of filler and the absence of foam stabilizers. Mechanical frothing to produce a stable froth requires that less filler and foam stabilizers be used, and is therefore a distinctly different process than that conventionally used to coat the back of a carpet for primary or laminate applications. Mechanical frothing of currently commercially available polyurethane dispersions using air, for example, can be carried out using additives such as, for example, stabilizing soap, inorganic filler, and wax dispersions. While foams, on casting and drying, having good physical properties and stable fine cell structure up to 10 mm thickness can be prepared, the foams so prepared are not resilient.

Resiliency is a desirable characteristic for foams used in applications such as carpet backings. Increasing the resilience of such a foam can increase both the durability and comfort of the foams. For example, a more resilient foam, or stated another way, a "springy" foam is commonly perceived as more comfortable than a non-resilient foam. A more resilient foam can also dissipate energy mechanically, by springing back, rather than as heat such as would a non-resilient foam. Dissipating energy as heat can eventually cause polymer degradation which in turn leads to the foam not returning to its original shape. When this occurs in a carpet application, the resulting pattern evident on the surface of the carpet in normal traffic areas can be perceived as premature wear.

It would be desirable, in the art of preparing polyurethane foams, to have a polyurethane dispersion composition that can be mechanically frothed such that a foam having suitable fine cell structure and good properties, including resilience, can be prepared. It would also be desirable in the art to have a process for preparing a polyurethane foam having good resilience from a polyurethane dispersions by mechanically frothing the polyurethane dispersions.

SUMMARY OF THE INVENTION

In one aspect, the present invention is a resilient polyurethane foam comprising a foam prepared by a process including the steps of frothing an aqueous polyurethane dispersion; applying the froth to a substrate; and drying the froth into a foam, wherein the polyurethane dispersion is prepared by admixing water, a chain extender, a surfactant, and a polyurethane prepolymer under mixing conditions sufficient to prepare a stable dispersion; the polyurethane is prepared from a formulation including a polyisocyanate and a polyol having a hydroxyl functionality of greater than about 2.2; and the polyurethane foam has a resiliency of from about 5 to about 80 percent.

In another aspect, the present invention is a foam backed substrate comprising a substrate and adherent thereto a resilient polyurethane foam prepared by a process including the steps of frothing an aqueous polyurethane dispersion; applying the froth to a substrate; and drying the froth into a foam, wherein the polyurethane dispersion is prepared by admixing water, a chain extender, a surfactant, and a polyurethane prepolymer under mixing conditions sufficient to prepare a stable dispersion; the polyurethane is prepared from a formulation including a polyisocyanate and a polyol having a hydroxyl functionality of greater than about 2.2; and the polyurethane foam has a resiliency of from about 5 to about 80 percent.

Frothed foams of the present invention can be useful in cushioned flooring applications such as attached cushion broadloom, carpet tiles, carpet underlay, or vinyl flooring. Frothed foams of the present invention could also be useful as cushion or absorbent layers for various textiles and disposable goods.

DESCRIPTION OF THE PREFERRED EMBODIMENTS

In one embodiment, the present invention is a resilient polyurethane foam prepared using an aqueous polyurethane dispersion composition that can be mechanically frothed to yield a polyurethane foam having good resiliency. A polyurethane dispersion useful in the practice of the present invention includes water, and either: a polyurethane; a mixture capable of forming a polyurethane; or a mixture of both. Polyurethane-forming materials as used in the present invention are materials which can be used to prepare polyurethane polymers. Polyurethane-forming materials include, for example, polyurethane prepolymers. While polyurethane prepolymers may retain some isocyanate reactivity for some period of time after dispersion, for purposes of the present invention, a polyurethane prepolymer dispersion shall be considered as being a fully reacted polyurethane polymer dispersion. Also, for purposes of the present invention, a polyurethane prepolymer or polyurethane polymer can include other types of structures such as, for example, urea groups.

Polyurethane prepolymers useful in the practice of the present invention are prepared by the reaction of active hydrogen compounds with any amount of isocyanate in a stoichiometric excess relative to active hydrogen material. Isocyanate functionality in the prepolymers useful with the present invention can be present in an amount of from about 0.2 weight percent to about 20 weight percent. A suitable prepolymer can have a molecular weight in the range of from about 100 to about 10,000. Prepolymers useful in the practice of the present invention should be substantially liquid under the conditions of dispersal.

The prepolymer formulations of the present invention include a polyol component. Active hydrogen containing compounds most commonly used in polyurethane production are those compounds having at least two hydroxyl groups or amine groups. Those compounds are referred to herein as polyols. Representatives of suitable polyols are generally known and are described in such publications as High Polymers, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); Organic Polymer Chemistry by K. J. Saunders, Chapman and Hall, London, pp. 323–325 (1973); and Developments in Polyurethanes, Vol. I, J. M. Burst, ed., Applied Science Publishers, pp. 1–76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2, 6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the propylene oxide adducts and ethylene oxide capped propylene oxide adducts of dihydroxy- and trihydroxyalkanes. Other useful alkylene oxide adducts include adducts of ethylene diamine, glycerin, piperazine, water, ammonia, 1,2,3,4-tetrahydroxy butane, fructose, sucrose, and the like.

Also useful with the present invention are poly (oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Another class of polyols which can be used with the present invention are "copolymer polyols", which are base polyols containing dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol.

Polyester polyols can be used to prepare the polyurethane dispersions of the present invention. Polyester polyols are generally characterized by repeating ester units which can be aromatic or aliphatic and by the presence of terminal primary or secondary hydroxyl groups, but any polyester terminating in at least 2 active hydrogen groups can be used with the present invention. For example, the reaction product of the transesterification of glycols with poly(ethylene terephthalate) can be used to prepare the dispersions of the present invention.

Polyamines, amine-terminated polyethers, polymercaptans and other isocyanate-reactive compounds are also suitable in the present invention. Polyisocyanate polyaddition active hydrogen containing compounds (PIPA) can be used with the present invention. PIPA compounds are typically the reaction products of TDI and triethanolamine. A process for preparing PIPA compounds can be found in, for example, U.S. Pat. No. 4,374,209, issued to Rowlands.

In the practice of the present invention, preferably at least 50 weight percent of the active hydrogen compounds used to prepare the polyurethane or polyurethane prepolymer is a polyether polyol a having molecular weight of from about 600 to about 20,000, preferably about 1,000 to about 10,000, most preferably about 3,000 to about 8,000. In the practice of the present invention, preferably this polyol has a hydroxyl functionality of at least 2.2. Preferably this polyol has a hydroxyl functionality of from 2.2 to about 5.0, more preferably from about 2.3 to about 4.0 and even more preferably from about 2.5 to about 3.8. Most preferably, the active hydrogen compounds used to prepare the polyurethane or polyurethane prepolymer is a polyether polyol having a hydroxyl functionality of from about 2.6 to about 3.5 and a molecular weight of from about 3,000 to about 8,000. For purposes of the present invention, functionality is defined to mean the average calculated functionality of all polyol initiators further adjusted for any known side reactions which affect functionality during polyol production.

The polyisocyanate component of the formulations of the present invention can be prepared using any organic polyisocyanates, modified polyisocyanates, isocyanate-based prepolymers, and mixtures thereof. These can include aliphatic and cycloaliphatic isocyanates, but aromatic and especially multifunctional aromatic isocyanates such as 2,4- and 2,6-toluenediisocyanate and the corresponding isomeric mixtures; 4,4'-, 2,4'- and 2,2'-diphenyl-methanediisocyanate (MDI) and the corresponding isomeric mixtures; mixtures of 4,4'-, 2,4'- and 2,2'-diphenylmethanediisocyanates and polyphenyl polymethylene polyisocyanates (PMDI); and mixtures of PMDI and toluene diisocyanates are preferred. Most preferably, the polyisocyanate used to prepare the prepolymer formulation of the present invention is MDI or PMDI.

The present invention includes a chain extender or crosslinker. A chain extender is used to build the molecular weight of the polyurethane prepolymer by reaction of the chain extender with the isocyanate functionality in the polyurethane prepolymer, i.e., chain extend the polyurethane prepolymer. A suitable chain extender or crosslinker is typically a low equivalent weight active hydrogen containing compound having about 2 or more active hydrogen groups per molecule. Chain extenders typically have 2 or more active hydrogen groups while crosslinkers have 3 or more active hydrogen groups. The active hydrogen groups can be hydroxyl, mercaptyl, or amino groups. An amine chain extender can be blocked, encapsulated, or otherwise rendered less reactive. Other materials, particularly water, can function to extend chain length and, therefore, can be chain extenders for purposes of the present invention.

Polyamines are preferred chain extenders. It is particularly preferred that the chain extender be selected from the group consisting of amine terminated polyethers such as, for example, JEFFAMINE D-400 from Huntsman Chemical Company, amino ethyl piperazine, 2-methyl piperazine, 1,5-diamino-3-methyl-pentane, isophorone diamine, ethylene diamine, diethylene triamine, aminoethyl ethanolamine, triethylene tetraamine, triethylene pentaamine, ethanol amine, lysine in any of its stereoisomeric forms and salts thereof, hexane diamine, hydrazine and piperazine. In the practice of the present invention, the chain extender can be used as an aqueous solution.

In the practice of a present invention, a chain extender is employed in an amount sufficient to react with from about zero (0) to about 100 percent of the isocyanate functionality present in the prepolymer, based on one equivalent of isocyanate reacting with one equivalent of chain extender. It can be desirable to allow water to act as a chain extender and react with some or all of the isocyanate functionality present. A catalyst can optionally be used to promote the reaction between a chain extender and an isocyanate. When chain extenders of the present invention have more than two active hydrogen groups, then they can also concurrently function as crosslinkers.

A polyurethane formulation suitable for preparing a foam of the present invention (hereinafter Compound) can be prepared from a polyurethane dispersion and a foam stabilizer. In addition to a polyurethane dispersion and a foam stabilizer, a Compound of the present invention can optionally include: cross-linkers; surfactants; fillers; dispersants; thickeners; fire retardants; absorbents; fragrances and/or other materials known in the art to be useful in the preparation of polymer foam products. The term "Compound" particularly means the material placed into a frother to produce a froth which can be dried to form a foam.

A Compound of the present invention optionally includes a filler material. The filler material can include conventional fillers such as milled glass, calcium carbonate, aluminum trihydrate, talc, bentonite, antimony trioxide, kaolin, fly ash, or other known fillers. In the practice of the present invention, a suitable filler loading in a polyurethane dispersion can be from about 0 to about 500 parts of filler per 100 parts of polyurethane. Preferably, filler can be loaded in an amount of less than about 250 pph, more preferably less than about 200 pph, most preferably less than about 150 pph.

The present invention optionally includes a filler wetting agent. A filler wetting agent generally can help make the filler and the polyurethane dispersion compatible. Useful wetting agents include phosphate salts such as sodium hexametaphosphate. A filler wetting agent can be included in a Compound of the present invention at a concentration of at least about 0.5 parts per 100 parts of filler, by weight.

The present invention optionally includes thickeners. Thickeners can be useful in the present invention to increase the viscosity of low viscosity polyurethane dispersions. Thickeners suitable for use in the practice of the present invention can be any known in the art. For example, suitable thickeners include ALCOGUM™ VEP-II (trade designation of Alco Chemical Corporation) and PARAGUM™ 241 (trade designation of Para-Chem Southern, Inc.). Thickeners can be used in any amount necessary to prepare a Compound of desired viscosity.

The present invention can include other optional components. For example, a formulation of the present invention can include surfactants, frothing agents, dispersants, thickeners, fire retardants, pigments, antistatic agents, reinforcing fibers, antioxidants, preservatives, biocides, acid scavengers, and the like. Examples of suitable frothing agents include: gases and/or mixtures of gases such as, for example, air, carbon dioxide, nitrogen, argon, helium, and the like. While optional for purposes of the present invention, some components can be highly advantageous for product stability during and after the manufacturing process. For example, inclusion of antioxidants, biocides, and preservatives can be highly advantageous in the practice of the present invention.

Preferred in the practice of this invention is the use of a gas as a frothing agent. Particularly preferable is the use of air as a frothing agent. Frothing agents are typically introduced by mechanical introduction of a gas into a liquid to form a froth, that is mechanical frothing. In preparing a frothed polyurethane backing, it is preferred to mix all components and then blend the gas into the mixture, using equipment such as an OAKES or FIRESTONE frother.

Surfactants can be useful for preparing a stable dispersion of the present invention, and/or a surfactant useful for preparing a stable froth. Surfactants useful for preparing a stable dispersion are optional in the practice of the present invention, and can be cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes 2,2-dimethylol propionic acid and its salts. A surfactant can be included in a formulation of the present invention in an amount ranging from about 0.01 to about 8 parts per 100 parts by weight of polyurethane component.

Surfactants useful for preparing a stable froth are referred to herein as foam stabilizers. Foam stabilizers are essential in the practice of the present invention. In addition to the surfactants described hereinabove, foam stabilizers can include, for example, sulfates, succinamates, and sulfosuccinamates. Any foam stabilizer known to useful by those of ordinary skill in the art of preparing polyurethane foams can be used with the present invention.

Catalysts are optional in the practice of the present invention. Catalysts suitable for use in preparing the polyurethanes and polyurethane prepolymers of the present invention include tertiary amines, and organometallic compounds, like compounds and mixtures thereof. For example, suitable catalysts include di-n-butyl tin bis (mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, like compounds and mixtures thereof. An amount of catalyst is advantageously employed such that a relatively rapid cure to a tack-free state can be obtained. If an organometallic catalyst is employed, such a cure can be obtained using from about 0.01 to about 0.5 parts per 100 parts of the polyurethane prepolymer, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

Generally, any method known to one skilled in the art of preparing polyurethane dispersions can be used in the practice of the present invention to prepare a polyurethane dispersions material suitable for preparing, for example, a carpet of the present invention. A suitable storage-stable polyurethane dispersions as defined herein is any polyurethane dispersions having a mean particle size of less than about 5 microns. A polyurethane dispersions that is not storage-stable can have a mean particle size of greater than 5 microns. For example, a suitable dispersion can be prepared by mixing a polyurethane prepolymer with water and dispersing the prepolymer in the water using a mixer. Alternatively, a suitable dispersion can be prepared by feeding a prepolymer into a static mixing device along with water, and dispersing the water and prepolymer in the static mixer. Continuous methods for preparing aqueous dispersions of polyurethane are known and can be used in the practice of the present invention. For example, U.S. Pat. Nos.: 4,857,565; 4,742,095; 4,879,322; 3,437,624; 5,037,864; 5,221,710; 4,237,264; and 4,092,286 all describe continuous processes useful for preparing polyurethane dispersions. In addition, a polyurethane dispersion having a high internal phase ratio can be prepared by a continuous process such as is described in U.S. Pat. No. 5,539,021.

Other types of aqueous dispersions can be used in combination with the polyurethane dispersions of the present invention. Suitable dispersions useful for blending with polyurethane dispersions of the present invention include: styrene-butadiene dispersions; styrene-butadiene-vinylidene chloride dispersions; styrene-alkyl acrylate dispersions; ethylene vinyl acetate dispersions; polychloropropylene latexes; polyethylene copolymer latexes; ethylene styrene copolymer latexes; polyvinyl chloride latexes; or acrylic dispersions, like compounds, and mixtures thereof.

The polyurethane foams of the present invention are resilient. For purposes of the present invention, a resilient foam is one which has a minimum resiliency of 5 percent when tested by the falling ball method. This method, ASTM D1564-64T, generally consists of dropping a ball of known weight from a standard height onto a sample of the foam and then measuring the rebound of the ball as a percentage of the height from which it was dropped. Preferably the foams of the present invention have a resiliency of from about 5 to about 80 percent, more preferably from about 10 to about 60 percent, and most preferably from about 15 to about 50 percent. The resiliency of foams of the present invention can impart longer wear and greater comfort to products including them than can conventional polyurethane foams prepared from aqueous polyurethane dispersions.

A polyurethane dispersion of the present invention can be stored for later application to the back of a substrate, such as, for example, a carpet. Storage for this purpose requires that the dispersion be storage-stable. Alternatively, the polyurethane dispersion can be applied in a continuous manner to the back of a carpet substrate, that is, the dispersion can be applied to the back of a carpet as the dispersion is prepared according to the practice of the present invention.

In the practice of the present invention, a frothed polyurethane layer is dried to prepare a foam. For the purposes of the present invention, this means that the froth is treated in any way such that the froth structural integrity is maintained and after the froth is substantially free of water, the resulting material is a resilient polyurethane cellular foam. Drying can be at ambient temperature but preferably is done in an oven at temperatures of from about 50 to about 200° C.

In preparing polymer backed carpets according to the present invention, a polyurethane dispersion is applied as a layer of preferably uniform thickness onto the non-pile surface of a suitably prepared carpet substrate. Polyurethane precoats, laminate coats, and foam coats can be prepared by methods known to those of ordinary skill in the art of preparing such backings. Precoats, laminate coats and foam coats prepared from dispersions are described in P. L. Fitzgerald, "Integral Dispersion Foam Carpet Cushioning", J. Coat. Fab. 1977, Vol. 7 (pp. 107–120), and in R. P. Brentin, "Dispersion Coating Systems for Carpet Backing", J. Coat. Fab. 1982, Vol. 12 (pp. 82–91).

A reactive polyurethane backing, also known as an A+B backing, such as is formed by the reaction of a polyisocyanate and a polyol in the presence of a catalyst and blowing agent, can be applied to one surface of a carpet substrate before it cures to a tack-free state to form a carpet. Alternatively, in the practice of the present invention, a polyurethane dispersion containing no unreacted isocyanate functionality can be advantageously applied to the surface of a carpet substrate, thereby removing the need to react the polyurethane precursors in situ to form the polyurethane polymer. Typically the polyurethane dispersion, usually in the form of a Compound, is applied as a stable froth to a carpet surface which has been coated with a primary backing or precoat. The polyurethane dispersion may be applied to a suitable substrate using equipment such as a doctor knife or roll, air knife, or extruder to apply and gauge the layer. The amount of polyurethane dispersion used to coat a textile can vary widely, ranging from about 1.5 to about 300 ounces per square yard (53 g/m$^2$–10.7 kg/m$^2$) dry weight, depending on the characteristics of the textile. Preferably, the foams of the present invention are applied at a level of from about 5 to about 50 ounces per square yard (170 g/m$^3$–1.8 kg/m$^3$) dry polymer weight. After the layer is applied and gauged, the layer can be dried using heat from any suitable heat source such as an infrared oven, a convection oven, or heating plates.

In preparing the polyurethane foam backed substrates of the present invention in general and the backed textiles in particular, it is advantageous to dry the polyurethane dispersion as quickly as possible after it is applied to the substrate. It has been observed that using a slow heating process can result in coarser cell structure in the center of the foam. It is particularly advantageous to do at least the initial drying of a polyurethane dispersion of the present invention using an infra-red heater as this practice can promote the formation of a smooth skin on the surface of the foam facing the heater which is both aesthetically desirable and may also be embossed or subjected to some other form of marking process.

One unique property of the polyurethane foams of the present invention is that they are resistant to yellowing. Conventional polyurethane foams, particularly those prepared with aromatic starting materials such as MDI or TDI, can yellow upon exposure to air and ultraviolet light. The foams of the present invention have a surprising ability to resist yellowing under conditions which would cause yellowing in a conventional polyurethane foam.

The following examples are provided to illustrate the present invention. The examples are not intended to limit the scope of the present invention and should not be so interpreted. All percentages are by weight unless otherwise noted.

EXAMPLES

Materials used in the examples:

VORANOL 4701*—A 4950 molecular weight triol having 15 percent EO capping (* Trade designation of The Dow Chemical Company).

ISONATE 125M*—4,4'-methylene diphenyl isocyanate having a functionality of 2.0 and an equivalent weight of 125 g/equivalent (* Trade designation of The Dow Chemical Company).

ISONATE 50 OP*—A 50 percent 4,4'-methylene diphenyl isocyanate, 50 percent 2,4'-methylene diphenyl isocyanate mixture having a functionality of 2.0 and an equivalent weight of 125 g/equivalent (* Trade designation of The Dow Chemical Company).

MPEG 950*—Monol produced by reacting ethylene oxide with methanol to an equivalent weight of 950 g/equivalent (* Trade designation of The Dow Chemical Company).

BIO-TERGE AS-40*—Mixed olefin (C14–16) sodium sulfonate (*Trade designation of Stepan Corporation).

EMPIMIN MK/B*—Di sodium N-tallow sulphosuccinamate available as a 35 percent active solution in water (* Trade designation of Albright & Wilson UK).

ACUSOL A810* Thickener—Acrylate thickener available as a 19 percent solution in water (* Trade designation of Rohm and Haas Co).

Antioxidant L: an emulsion of 54 parts $\beta,\beta$-ditrydecylthiodipropionate, 40 parts water, and 6 parts WINGSTAY L* which is a butylated reaction product of p-cresol and dicyclopentadiene (* Trade designation of Goodyear Rubber Company).

Example 1

Preparation of a Prepolymer

A prepolymer is prepared by adding 504 g of VORANOL 4701, 14 g MPEG 950, 9.1 g diethylene glycol, 86.45 g ISONATE 125 M, and 86.45 g ISONATE 50 OP into a glass bottle wherein the threads of the glass bottle are wrapped with TEFLON* tape to prevent the lid from adhering to the bottle (*A trade designation of DUPONT). The bottle is sealed, shaken vigorously until homogeneity of the components is achieved, and then rolled on a bottle roller for about 10 minutes. The bottle is then placed in an oven held at 70° C. for 15 hours, whereupon it was removed and allowed to cool to room temperature prior to use.

Preparation of an Aqueous Polyurethane Dispersion 75 g of prepolymer is weighed into an 8 oz glass bottle having an internal diameter of 5.6 cm. The bottle is clamped and an INDCO type A mixing blade (4.3 cm diameter from INDCO, INC.) is inserted into the prepolymer such that the blade is just covered by the liquid. Water is fed into the prepolymer at a rate of 14 g/min. for 2 minutes and 19 seconds while stirring is conducted at 3000 rpm. At 30 seconds into the water feed, 6.1 g of BIO-TERGE AS-40 is introduced over a period of no more than 5 seconds via syringe. After complete addition of the water, a solution of 10 percent piperazine in water (32.9 g, 80 percent stoichiometry based on prepolymer isocyanate equivalents) is added via syringe over a period of about 15 seconds. The resulting dispersion is then poured into a plastic tripour beaker, covered tightly with aluminum foil and allowed to stir gently overnight with a magnetic stirrer. The next day the 55 percent solids dispersion is filtered through a coarse paint filter.

Preparation of a Resilient Polyurethane Frothed Foam 200 g of the aqueous polyurethane dispersion is mixed with 4.7 g of a 25 percent aqueous sodium lauryl sulfate solution, 18.7 g of EMPIMIN MK/B, and 3.6 g ACUSOL A810 thickener using a blender until frothing is observed. The froth is poured onto a sheet of polyester film and heated in an oven at 150° C. for 20 minutes to yield a resilient, low density foam.

Example 2

Preparation of a Prepolymer

A polyurethane prepolymer is prepared using a formulation which consists of 2 parts of MPEG 950, 72 parts of VORANOL 4701, 1.3 parts of diethylene glycol, 12.35 part each ISONATE 50 OP and ISONATE 125M.

Preparation of a Polyurethane Dispersion

A polyurethane dispersion is prepared by chain extending the prepolymer of this example in water with piperazine to a stoichiometry of 0.75 to a solids content of 52.7 percent. The dispersion is prepared with 3% BIO-TERG AS-40 surfactant, based on prepolymer solids. The polyurethane dispersion has a volume average particle size of 0.229 micron.

Preparation of a Resilient Polyurethane Frothed Foam

A compound is prepared using 215 parts of the polyurethane dispersion of this Example, 2.1 part Antioxidant L, 10 parts of EMPIMIN MK/B, and 3.6 parts of a 25 percent aqueous solution of sodium lauryl sulfate. The Compound is frothed using a COWIE RIDING FOAM MACHINE* (*Trade designation of Cowie & Riding Ltd.), and cast onto a TEFLON sheet. The foam is dried for 30 seconds under infrared heat and then for 20 minutes in an oven at 150° C. The foam is tested and the results of the tests are listed below in the table.

Example 3

A foam is prepared and tested substantially identically to Example 2 except that the Compound also includes 180 parts of calcium carbonate.

TABLE

| | Example 2 | Example 3 |
|---|---|---|
| Density g/dm$^3$* | 127 | 237 |
| Resilience - minimum (percent) | 45 | 25 |
| Resilience - maximum (percent) | 50 | 26 |
| Gauge Retention (percent)$^1$ | 109 | 130 |
| Compression Set (percent)$^2$ | | 48 |
| PeakLoad$^3$ | 24.8 | 14.1 |
| Elongation (percent)$^4$ | 325 | 225 |

$^1$Determined by measuring the thickness of the foam after dying and reported as a percentage of the original thickness of the foam as applied to the substrate.
$^2$ASTM D 1564B
$^3$DIN 53571 A
$^4$DIN 53571 A

What is claimed is:

1. A resilient polyurethane foam comprising a foam prepared by a process including the steps of (1) frothing an aqueous externally stabilized polyurethane dispersion; (2) applying the froth to a substrate; and (3) drying the froth into a foam, wherein:
    a) the externally stabilized polyurethane dispersion is prepared by admixing water, a chain extender, an external anionic surfactant, and a polyurethane prepolymer under mixing conditions sufficient to prepare a stable dispersion;
    b) the polyurethane is prepared from a formulation including a polyisocyanate and a polyol having a hydroxyl functionality of greater than about 2.2; and
    c) the polyurethane foam has a resiliency of from about 5 to about 80 percent.

2. The polyurethane foam of claim 1 wherein the polyurethane foam has a resiliency of from about 10 to about 60 percent.

3. The polyurethane foam of claim 2 wherein the polyurethane foam has a resiliency of from about 15 to about 50 percent.

4. The polyurethane foam of claim 1 wherein the polyurethane is prepared from a formulation including a polyol having a hydroxyl functionality of from about 2.2 to about 5.0.

5. The polyurethane foam of claim 4 wherein the polyurethane is prepared from a formulation including a polyol having a hydroxyl functionality of from about 2.3 to about 4.0.

6. The polyurethane foam of claim 5 wherein the polyurethane is prepared from a formulation including a polyol having a hydroxyl functionality of from about 2.6 to about 3.5.

7. The polyurethane foam of claim 6 wherein the polyurethane is prepared from a formulation including a polyol having a hydroxyl functionality of from about 2.6 to about 3.5 and that polyol is only polyol included in the formulation.

8. The polyurethane foam of claim 1 wherein the polyurethane prepolymer is prepared using from a formulation which includes MDI as the only polyisocyanate.

9. A foam backed substrate comprising a substrate and adherent thereto a resilient polyurethane foam of claim 1.

10. The foam backed substrate of claim 9 wherein the substrate is cushioned flooring and the foam is a filled foam.

11. The foamed back cushioned flooring of claim 10 wherein the cushioned flooring is a carpet.

12. A method of making a resilient polyurethane foam adhered to a substrate comprising the steps of (1) frothing an aqueous externally stabilized fully reacted polyurethane dispersion in the presence of a foam stabilizer; (2) applying the froth to a substrate, and (3) drying the froth into a foam, wherein:

a) the externally stabilized polyurethane dispersion is prepared by admixing water, a chain extender, an external anionic surfactant, and a polyurethane prepolymer under mixing conditions sufficient to prepare a stable dispersion;

b) the polyurethane is prepared from a formulation including a polyisocyanate and a polyol having a hydroxyl functionality of greater than about 2.2; and c) the polyurethane foam has a resiliency of from about 5 to about 80 percent.

13. The method of claim 12 wherein the froth includes a filler.

14. The method of claim 13 wherein the substrate is cushioned flooring.

15. The method of claim 12 wherein step (3) includes exposing a surface of the froth to infra-red heat to promote formation of a smooth skin on the surface of the foam facing the heater, and further drying the froth at temperatures of from 50° C. to 200° C.

16. The method of claim 15 wherein the substrate is a carpet and wherein the foam has a resiliency of from about 15 to about 50 percent.

17. The method of claim 12 wherein the foam is resistant to yellowing.

* * * * *